Patented Nov. 13, 1934

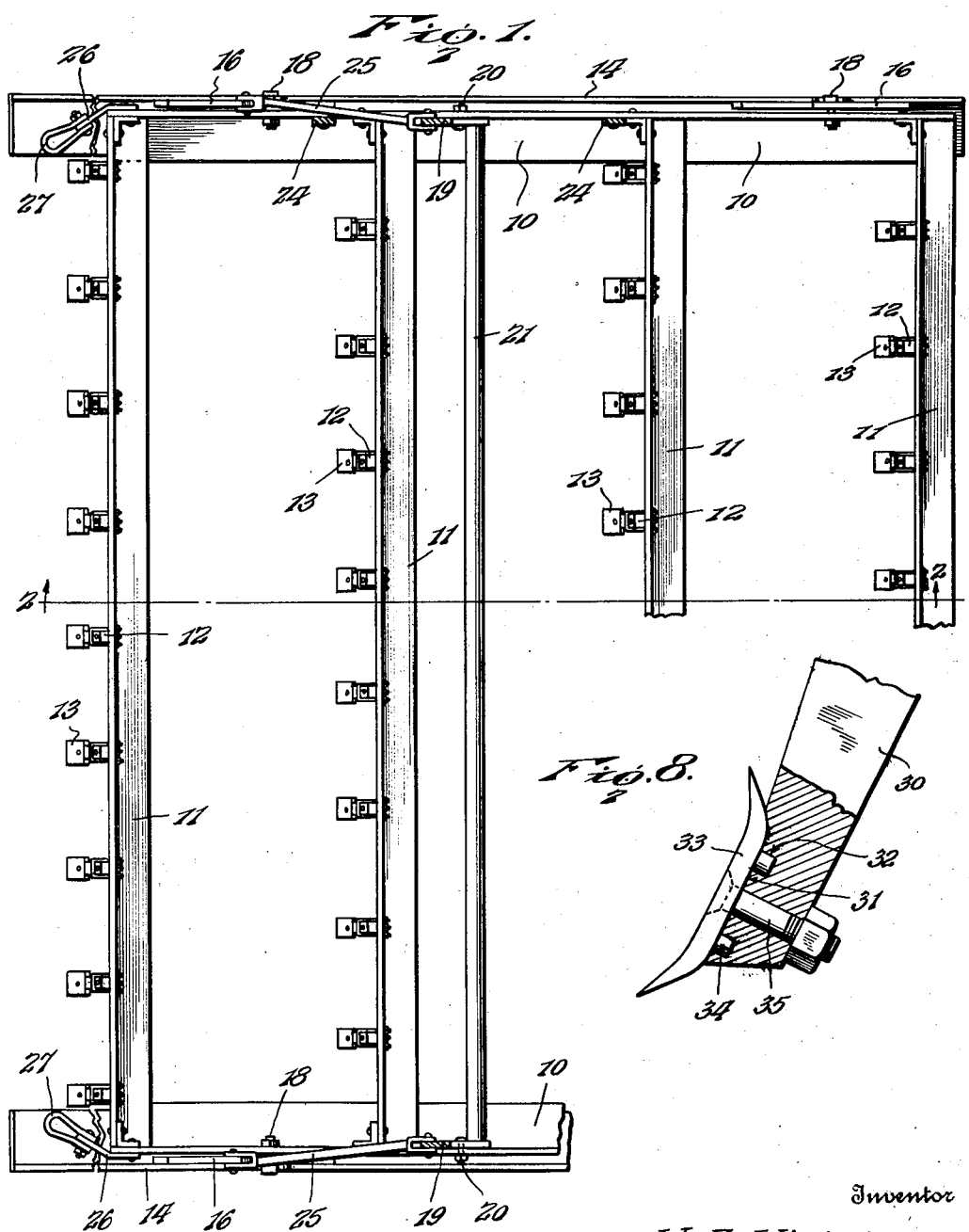

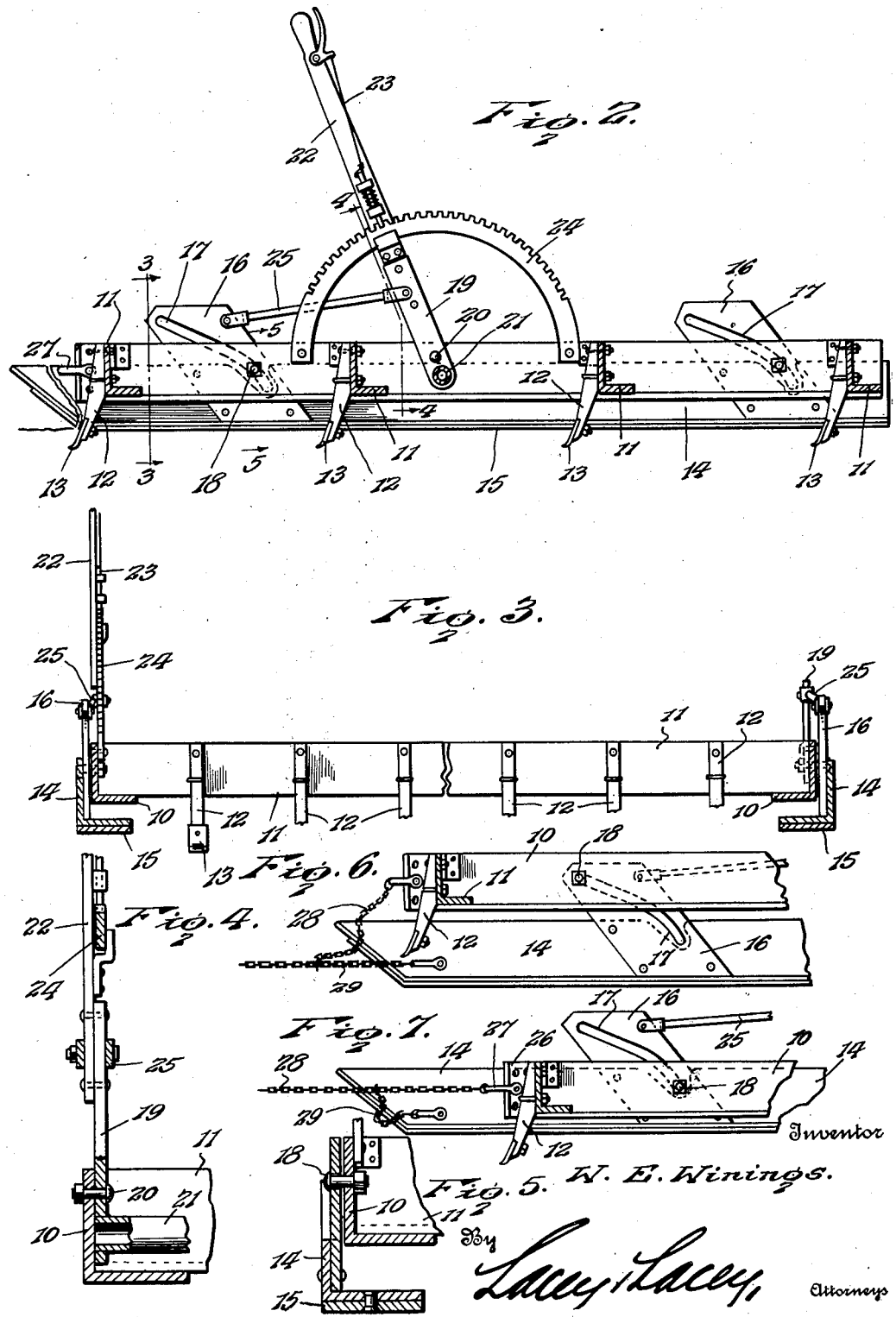

1,980,897

UNITED STATES PATENT OFFICE 1,980,897

ROAD MACHINE

Willie Ernest Winings, Arthur, Ill.

Application January 30, 1933, Serial No. 654,336

4 Claims. (Cl. 262—8)

This invention relates to an improved road machine and seeks, among other objects, to provide a simple yet highly effective device for scarifying road surfaces.

The invention seeks, as a further object, to provide a device embodying runners and a rigid scarifier connected with the runners and adjustable relative thereto so that the scarifier may be raised or lowered for varying the scarifying action of the machine.

And the invention seeks, as a still further object, to provide a device wherein, when the scarifier is raised to inactive position, draft on the device will be communicated directly to the runners, while, when the scarifier is lowered to active position to engage with a road surface, draft on the device will be communicated directly to the scarifier.

Other and incidental objects of the invention, not specifically mentioned in the foregoing, will be apparent during the course of the following description.

In the drawings, Figure 1 is a fragmentary plan view of my improved road machine, parts being shown in section, Figure 2 is a vertical sectional view on the line 2—2 of Figure 1, Figure 3 is a transverse sectional view on the line 3—3 of Figure 2, Figure 4 is a detail section on the line 4—4 of Figure 2, Figure 5 is a detail section on the line 5—5 of Figure 2, Figure 6 is a fragmentary section showing the action of the pull chain when the scarifier is raised, Figure 7 is a fragmentary section showing the action of the pull chain when the scarifier is lowered, and Figure 8 is a detail elevation, partly in section, showing a modified form of scarifier tooth and blade.

In carrying the invention into effect, I employ an oblong scarifier frame including side bars 10 connected by a plurality of parallel cross bars 11 rigidly secured at their ends to the side bars. Preferably, all of said bars are angle shaped in cross section and removably secured upon the forward sides of the bars 11 are rows of teeth 12 notched at their lower ends to accommodate detachable scarifying blades 13 bolted to the teeth. Preferably, the teeth on one bar are staggered with respect to the teeth on a preceding or a succeeding bar.

Connected with the side bars 10 of the scarifier frame are runners 14 which are preferably angle shaped in cross section and fixed to the bottom flanges of said runners are shoes 15 for resisting wear on the runners. The runners are of a length to project at the front and rear of the scarifier frame and fixed to each of said runners, near the ends thereof, are forwardly inclined upstanding guide plates 16. Formed in said plates are upwardly and forwardly directed cam slots 17, the lower portions of which are curved while the upper portions thereof are approximately straight, and carried by the side bars 10 of the scarifier frame and extending through said slots, as particularly seen in Figure 5, are bolts 18 detachably and slidably connecting the scarifier with the runners.

Pivotally mounted by bolts 20 upon the side bars 10 of the scarifier frame, medially thereof, are levers 19. Extending between the lower ends of said levers is a preferably tubular cross rod 21 rigidly connecting the levers to swing in unison. Attached to one lever 19, is a hand bar 22 although, if preferred, this bar may be formed integrally with the lever, and mounted on the bar is an appropriate latch, indicated as a whole at 23, the latch being arranged to coact with a rack 24 fixed to the adjacent side bar of the scarifier frame. Extending between the levers 19 and the upper ends of the respective forwardly disposed plates 16 are rods 25 pivotally connected to said levers and to the plates.

In Figure 2, the scarifier is shown in partially lowered position and, as will now be seen, by swinging the bar 22 forwardly and thus rocking the levers 19 forwardly, a forward thrust will be exerted on the runners 14 while a rearward thrust will be exerted on the scarifier frame with the result that the bolts 18 will be caused to ride downwardly within the curved lower end portions of the slots 17 so that the scarifier will be lowered with respect to the runners to more deeply engage the roadway. Conversely, by swinging the bar 22 rearwardly, a rearward pull will be exerted on the runners 14 while a forward thrust will be exerted on the scarifier with the result that the bolts 18 will be caused to ride upwardly in the slots 17 so that the scarifier will be raised and, of course, the latch 23, in conjunction with the rack 24, provides a means for locking the scarifier in any position of adjustment. If desired, the scarifier may be elevated until the blades 13 thereof entirely clear the roadway when the bolts 18 will rest within the straight upper end portions of the slots 17 and in thus forming the slots with straight upper end portions the scarifier will, of course, be lifted a greater distance for a given throw of the bar 22, as compared with the curved lower end portions of the slots. The bolts 18 will, however, coact with the curved lower end portions of the slots, when the scarifier is lowered, for resisting the lifting effect upon the scarifier when engaged with the roadway so that the force of the scarifier tending to ride upwardly on the plates 16 will not all be communicated to the latch 23 and rack 24. It will be readily noted that, while the scarifier is readily adjustable relative to the runners, it will be firmly held in any position in which it may be set so that it will operate effectively when in use.

Fixed to the forward end of the scarifier frame, at the corners thereof, are plates 26 to which are attached clevises 27 and secured at its ends to said clevises is a pull chain 28. Near its ends, this pull chain is equipped with branch chains 29 and these branch chains are appropriately secured to the forward ends of the runners 14. Thus, as particularly shown in Figures 6 and 7 of the drawings, when the scarifier is raised to inactive position so that the teeth thereof are out of engagement with the ground, draft will be communicated from the chain 28 through the branch chains 29 directly to the runners, the inner end portions of the chain 28 being flexed above the branch chains. On the other hand, when the scarifier is lowered, the extremities of the chain 28 will be carried to the rear of the branch chains and draft will be communicated through the pull chain 28 directly to the scarifier while the branch chains 29 will hang free below the line of the draft.

In Figure 8, I have shown a slightly modified form of tooth and scarifying blade. In this figure, a typical tooth is indicated at 30. The forward face of this tooth is cut away at its lower end to form a seat 31 concave at its upper extremity, and opening into the seat are spaced sockets 32. Fitting the seat is a double ended scarifying blade 33 having curved extremities tapering to a cutting edge, and projecting from the back of the blade are studs 34 accommodated in the sockets 32. Extending through the blade, medially thereof, and through the lower end of the tooth 30, is a bolt 35 detachably connecting the blade with the tooth. Thus, when one end of the blade becomes dulled by wear, the blade may be turned end for end and the unused end presented for use.

Having thus described the invention, I claim:

1. A road machine including a scarifier frame, ground breaking elements carried thereby, runners, guide plates carried by the runners and provided with downwardly and rearwardly extending cam slots, elements carried by and projecting from the frame and slidably engaging in said slots, rigidly connected levers swingingly mounted upon the sides of the frame to swing in unison, and links connecting said levers and respectively adjacent guide plates whereby the levers may be swung for raising and lowering the frame relative to the runners.

2. A road machine including a scarifier frame, teeth carried thereby, runners, a connection between the frame and runners operable for raising and lowering the frame when shifted longitudinally of the runners, means for shifting the frame, and draft connections to the frame and runners operable to communicate draft on the machine to the frame alone when the frame is lowered and to the runners alone when the frame is elevated.

3. A road machine comprising runners, a scarifier frame, ground breaking elements carried by the frame, guides rigidly secured to and rising from the runners and provided with downwardly and rearwardly extending cam slots, levers pivoted upon the sides of the scarifier frame and connected with the guides for raising and lowering the frame, and projections on the frame slidably engaged in the cam slots in the guides, the lower ends of the slots resisting relative rearward movement of the frame when the frame is fully lowered.

4. A road machine comprisng runners, a scarifier frame carried by the runners and adjustable longitudinally and vertically relative to the runners, means for locking the frame in set positions, a draft chain having its ends secured to the front of the frame and branch chains connecting the draft chain with the front ends of the runners.

WILLIE ERNEST WININGS.